United States Patent
Ishiguro et al.

(10) Patent No.: US 7,710,618 B2
(45) Date of Patent: May 4, 2010

(54) IMAGE READING APPARATUS FOR DETECTING NOISE IN IMAGE DATA

(75) Inventors: Kazuhiro Ishiguro, Toyohashi (JP); Hiroyuki Suzuki, Toyokawa (JP); Hideyuki Toriyama, Toyokawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1102 days.

(21) Appl. No.: 11/017,662

(22) Filed: Dec. 22, 2004

(65) Prior Publication Data

US 2006/0066917 A1    Mar. 30, 2006

(30) Foreign Application Priority Data

Sep. 30, 2004    (JP)    ............................. 2004-285828

(51) Int. Cl.
H04N 1/46    (2006.01)
(52) U.S. Cl. ...................................... 358/514; 358/505
(58) Field of Classification Search ................. 358/463, 358/464, 474, 505, 512, 514, 1.9, 3.02, 522, 358/521, 531; 382/275, 266, 199
See application file for complete search history.

(56) References Cited

U.S. PATENT DOCUMENTS

| | | | |
|---|---|---|---|
| 4,980,760 A | 12/1990 | Hiratsuka et al. | |
| 5,317,420 A | 5/1994 | Kuwahara | |
| 5,850,293 A | 12/1998 | Suzuki et al. | |
| 5,982,946 A | 11/1999 | Murakami | |
| 6,125,213 A | 9/2000 | Morimoto | |
| 6,215,512 B1 | 4/2001 | Imaizumi et al. | |
| 6,323,959 B1 | 11/2001 | Toyama et al. | |
| 6,441,915 B1 | 8/2002 | Imaizumi et al. | |
| 6,625,331 B1 | 9/2003 | Imaizumi et al. | |
| 6,631,207 B2 | 10/2003 | Hirota et al. | |
| 6,728,418 B1 | 4/2004 | Kumagai et al. | |
| 6,778,297 B1 | 8/2004 | Fujiwara | |
| 6,806,902 B1 | 10/2004 | Donovan | |
| 7,046,861 B2 | 5/2006 | Imaizumi et al. | |
| 7,072,075 B2 * | 7/2006 | Kondo et al. | ................. 358/1.9 |

(Continued)

FOREIGN PATENT DOCUMENTS

EP    0270090    9/1993

(Continued)

OTHER PUBLICATIONS

U.S. Appl. No. 11/012,184, filed Dec. 16, 2004, Ishiguro et al.

(Continued)

*Primary Examiner*—Douglas Q Tran
(74) *Attorney, Agent, or Firm*—Morrison & Foerster LLP

(57) ABSTRACT

An image reading apparatus includes: three line sensors mutually spaced in a sub scanning direction; a platen arranged between the original and the three line sensors; a mover moving the platen at a rate relative to the three line sensors, the rate being different from that of the original relative to the three line sensors; a first detector detecting a noise pixel based on a plurality of data output from the three line sensors; and a second detector detecting a subsequent noise pixel based on the noise pixel detected with the first detector.

3 Claims, 12 Drawing Sheets

U.S. PATENT DOCUMENTS

| | | | |
|---|---|---|---|
| 7,079,685 | B1 | 7/2006 | Hirota et al. |
| 7,283,164 | B2 * | 10/2007 | Kakarala et al. ............ 348/246 |
| 7,382,406 | B2 | 6/2008 | Higuchi |
| 2001/0026380 | A1 * | 10/2001 | Imoto ......................... 358/496 |
| 2002/0136463 | A1 | 9/2002 | Akahori et al. |
| 2006/0066915 | A1 | 3/2006 | Saka et al. |
| 2006/0066916 | A1 | 3/2006 | Ishiguro et al. |
| 2006/0066918 | A1 | 3/2006 | Ishiguro et al. |
| 2006/0066919 | A1 | 3/2006 | Saka et al. |
| 2006/0066920 | A1 | 3/2006 | Saka et al. |
| 2006/0066921 | A1 | 3/2006 | Saka et al. |
| 2006/0072169 | A1 | 4/2006 | Ishiguro et al. |
| 2006/0072826 | A1 | 4/2006 | Ishiguro et al. |
| 2006/0098248 | A1 | 5/2006 | Suzuki et al. |

FOREIGN PATENT DOCUMENTS

| | | |
|---|---|---|
| JP | 63-141455 | 6/1988 |
| JP | 1-309467 | 12/1989 |
| JP | 05-324812 | 12/1993 |
| JP | 9-139844 A | 5/1997 |
| JP | 10-228536 | 8/1998 |
| JP | 11-266373 | 9/1999 |
| JP | 2000-278485 | 10/2000 |
| JP | 2000-287031 A | 10/2000 |
| JP | 2000-324312 | 11/2000 |
| JP | 2001-103249 | 4/2001 |
| JP | 2001-272829 A | 10/2001 |
| JP | 2002-77584 | 3/2002 |
| JP | 2002-185767 | 6/2002 |
| JP | 2002-271631 | 9/2002 |
| JP | 2002-354262 | 12/2002 |
| JP | 2003-8846 | 1/2003 |
| JP | 2003-259096 A | 9/2003 |
| JP | 2003-315933 | 11/2003 |
| JP | 2004-112611 | 4/2004 |
| JP | 2004-112645 | 4/2004 |

OTHER PUBLICATIONS

U.S. Appl. No. 11/012,231, filed Dec. 16, 2004, Ishiguro et al.
U.S. Appl. No. 11/019,520, filed Dec. 23, 2004, Ishiguro et al.
U.S. Appl. No. 11/019,181, filed Dec. 23, 2004, Ishiguro et al.
U.S. Appl. No. 11/019,712, filed Dec. 23, 2004, Saka et al.
U.S. Appl. No. 11/020,209, filed Dec. 27, 2004, Saka et al.
U.S. Appl. No. 11/020,232, filed Dec. 27, 2004, Suzuki et al.
U.S. Appl. No. 11/020,233, filed Dec. 27, 2004, Saka et al.
U.S. Appl. No. 11/020,479, filed Dec. 27, 2004, Saka et al.
Japanese Office Action mailed on Oct. 28, 2008 directed towards foreign application No. 2004-286214; 4 pages.
Japanese Notice of Grounds of Rejection, mailed on Feb. 10, 2009, directed to Japanese Patent Application No. 2004-326869; 4 pages.
Ishiguro et al., U.S. Office Action, mailed Sep. 18, 2008, directed to U.S. Appl. No. 11/012,184; 13 pages.
Ishiguro et al., U.S. Office Action, mailed Apr. 10, 2009, directed to U.S. Appl. No. 11/012,184; 13 pages.
Ishiguro et al., U.S. Office Action, mailed May 12, 2008, directed to U.S. Appl. No. 11/012,231; 27 pages.
Ishiguro et al., U.S. Office Action, mailed Nov. 20, 2008, directed to U.S. Appl. No. 11/012,231; 28 pages.
Ishiguro et al., U.S. Office Action, mailed Jun. 26, 2009, directed to U.S. Appl. No. 11/012,231; 6 pages.
Ishiguro et al., U.S. Office Action, mailed Oct. 25, 2007, directed to U.S. Appl. No. 11/019,520; 9 pages.
Ishiguro et al., U.S. Office Action, mailed Sep. 23, 2008, directed to U.S. Appl. No. 11/019,181; 13 pages.
Ishiguro et al., U.S. Office Action, mailed Apr. 13, 2009, directed to U.S. Appl. No. 11/019,181; 14 pages.
Saka et al., U.S. Office Action, mailed May 22, 2008, directed to U.S. Appl. No. 11/019,712; 28 pages.
Saka et al., U.S. Office Action, mailed Nov. 10, 2008, directed to U.S. Appl. No. 11/019,712; 36 pages.
Saka et al., U.S. Office Action, mailed Apr. 22, 2009, directed to U.S. Appl. No. 11/019,712; 27 pages.
Saka et al., U.S. Office Action, mailed Jul. 3, 2008, directed to U.S. Appl. No. 11/020,209; 31 pages.
Saka et al., U.S. Office Action, mailed Jan. 27, 2009, directed to U.S. Appl. No. 11/020,209; 30 pages.
Saka et al., U.S. Office Action, mailed Jun. 29, 2009, directed to U.S. Appl. No. 11/020,209; 31 pages.
Suzuki et al., U.S. Office Action, mailed May 23, 2008, directed to U.S. Appl. No. 11/020,232; 19 pages.
Suzuki et al., U.S. Office Action, mailed Nov. 13, 2008, directed to U.S. Appl. No. 11/020,232; 22 pages.
Suzuki et al., U.S. Office Action, mailed May 18, 2009, directed to U.S. Appl. No. 11/020,232; 6 pages.
Saka et al., U.S. Office Action, mailed Jul. 2, 2008, directed to U.S. Appl. No. 11/020,479; 31 pages.
Saka et al., U.S. Office Action, mailed Jan. 22, 2009, directed to U.S. Appl. No. 11/020,479; 31 pages.
Saka et al., U.S. Office Action, mailed May 14, 2009, directed to U.S. Appl. No. 11/020,479; 34 pages.
Saka et al., U.S. Office Action, mailed Jan. 26, 2010, directed to U.S. Appl. No. 11/020,479; 4 pages.
Suzuki et al., U.S. Office Action, mailed Feb. 2, 2010, directed to U.S. Appl. No. 11/020,232; 4 pages.

* cited by examiner

F I G. 1
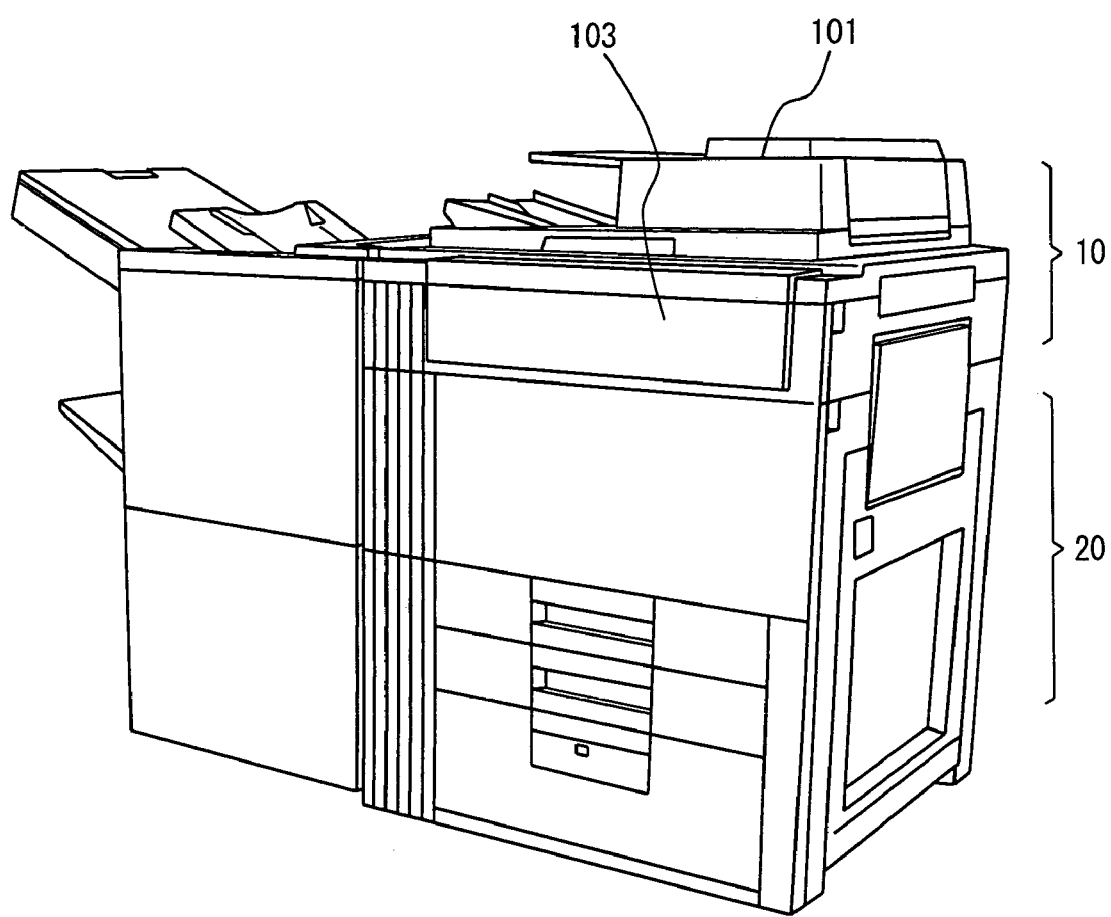

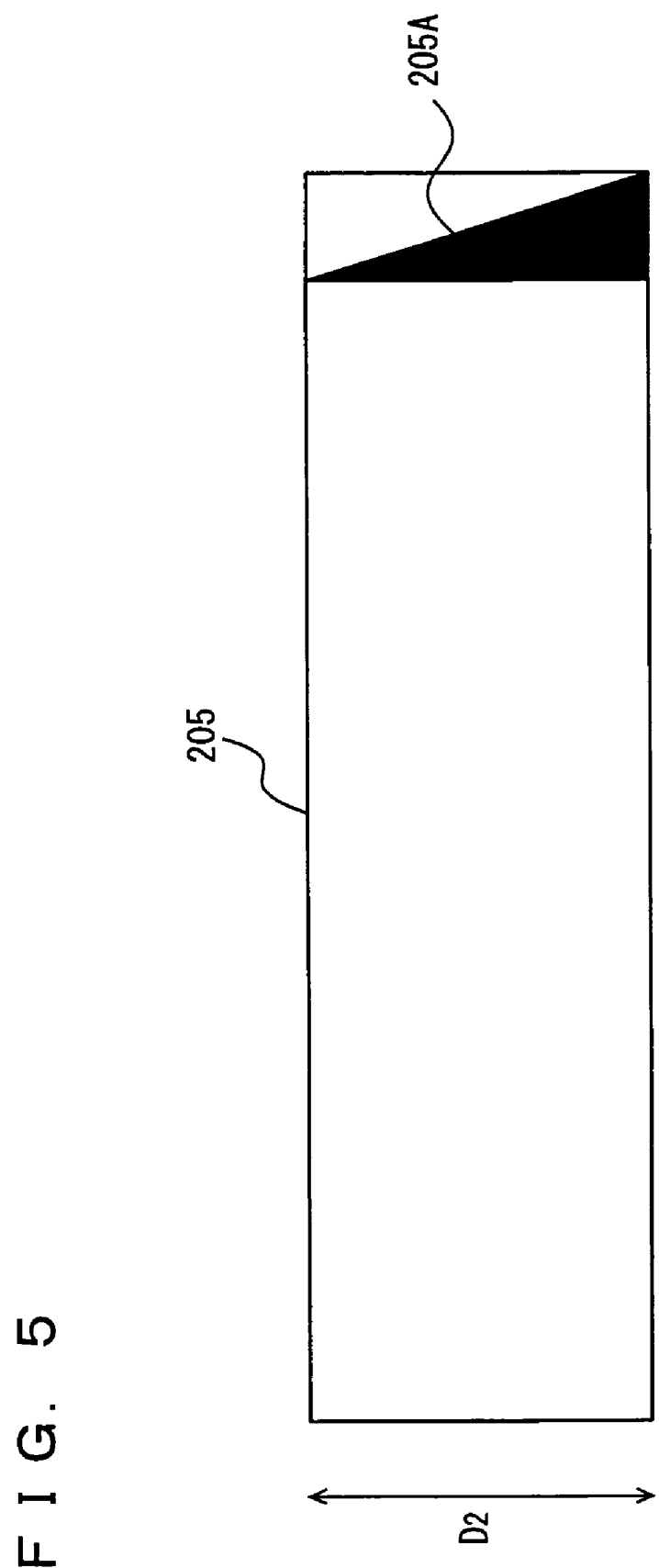

F I G. 6
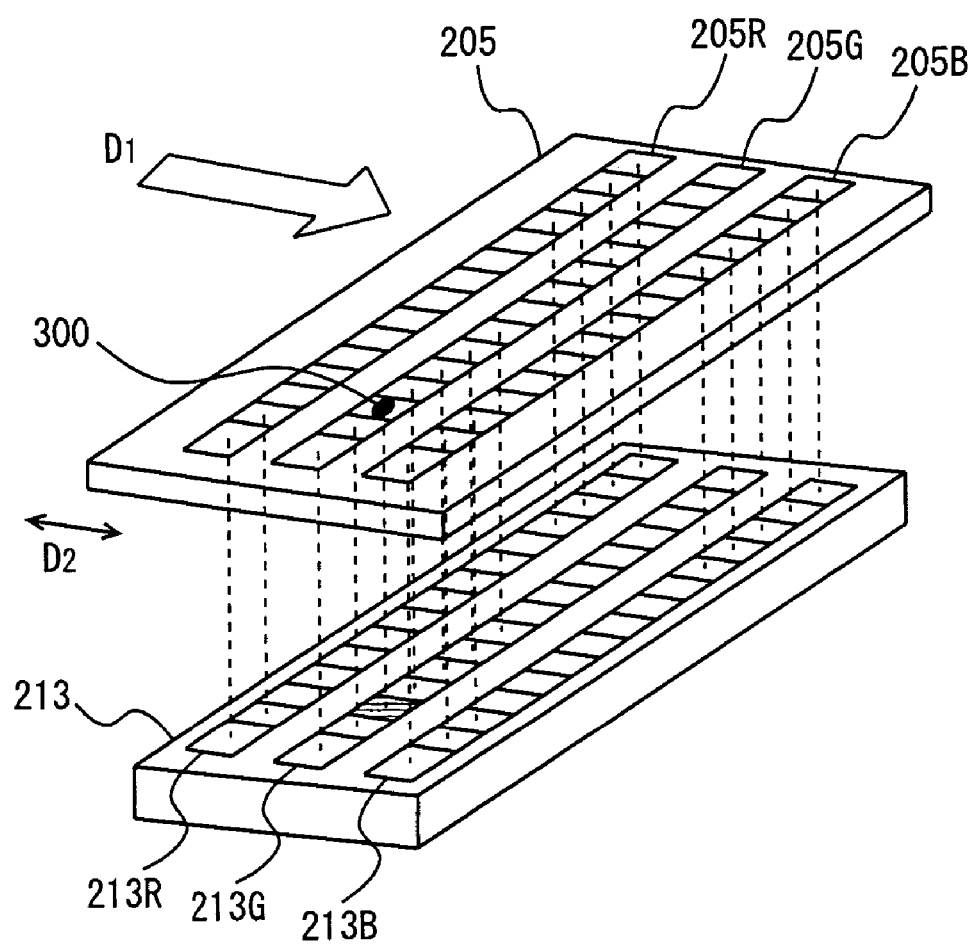

FIG. 11A
FIG. 11B
| C | C | C |
|---|---|---|
| C | A | C |
| C | C | C |
FIG. 11C
FIG. 11D
| C | C | C | C | C |
|---|---|---|---|---|
| C | B | B | B | C |
| C | B | A | B | C |
| C | B | B | B | C |
| C | C | C | C | C |
FIG. 11E
FIG. 11F
| C | C | C | C | C | C | C |
|---|---|---|---|---|---|---|
| C | B | B | B | B | B | C |
| C | B | B | B | B | B | C |
| C | B | B | A | B | B | C |
| C | B | B | B | B | B | C |
| C | B | B | B | B | B | C |
| C | C | C | C | C | C | C |

IMAGE READING APPARATUS FOR DETECTING NOISE IN IMAGE DATA

This application is based on Japanese Patent Application No. 2004-285828 filed with the Japan Patent Office on Sep. 30, 2004, the entire content of which is hereby incorporated by reference.

BACKGROUND OF THE INVENTION

1. Field of the Invention

The present invention relates generally to image reading apparatuses and particularly to image reading apparatuses reading an original while transporting it.

2. Description of Related Art

Conventionally digital copiers and similar image reading apparatuses employ a technique referred to as so-called "reading an original while passing the original." More specifically, an original is transported relative to a fixed line sensor in a sub scanning direction orthogonal to the line sensor as the original is read.

Such image reading apparatus is provided with a transparent platen between the original and the line sensor to fix a position at which a transported original is read. The original reflects light which is in turn received via the platen by the line sensor.

As such, if dust, paper particles, flaws or other similar foreign matters (hereinafter generally referred to as "dust") adhered on the platen's reading position, the line sensor will read the dust while reading a transported original. This provides an output image with noise in the form of a line in the sub scanning direction.

Japanese Laid-Open Patent publication No. 2000-278485 describes an image reading apparatus that detects noise caused by dust adhering on a platen glass's reading position from a read image by oscillating the platen in a main scanning direction as the apparatus reads an original. This image reading apparatus detects a specific waveform appearing in an image as noise generated by reading dust.

The image reading apparatus described in Japanese Laid-Open Patent publication No. 2000-278485, however, employs pattern-matching to detect the specific waveform appearing in an image. As such, if an original includes such a pattern, the apparatus would erroneously detect the pattern.

SUMMARY OF THE INVENTION

The present invention has been made to overcome the above disadvantage and contemplates an image reading apparatus capable of detecting with improved precision noise generated in an image by dust existing on a platen.

To achieve the above object the present invention in one aspect provides an image reading apparatus including: a plurality of line sensors mutually spaced in a sub scanning direction to scan an original in the sub scanning direction; a platen arranged between the original and the plurality of line sensors; a mover moving the platen at a rate relative to the plurality of line sensors, the rate being different from that of the original relative to the plurality of line sensors; a first detector detecting a noise pixel based on a plurality of data output from the plurality of line sensors; and a second detector detecting a subsequent noise pixel based on the noise pixel detected with the first detector.

In accordance with the present invention an original is scanned in a sub scanning direction by a plurality of sensors spaced in the sub scanning direction and between the original and the plurality of sensors there is provided a platen moving at a rate relative to the plurality of line sensors, the rate being different from that of the original relative to the plurality of line sensors. When the platen has dust adhering thereon, the dust is read by the plurality of line sensors sequentially. As the platen is moved at a rate relative to the plurality of line sensors, the rate being different from that of the original relative to the plurality of line sensors, the dust on the platen is read by each line sensor at a different location in the original. The image reading apparatus detects a noise pixel based on a plurality of data output from the plurality of line sensors, and detects a subsequent noise pixel based on the noise pixel detected. The image reading apparatus can detect the noise generated by dust existing on the platen from an image of a read original with higher precision.

According to another aspect of the present invention, an image reading apparatus for reading an original image and outputting image data includes: a plurality of line sensors mutually spaced in a sub scanning direction to scan an original in the sub scanning direction; a platen arranged between the original and the plurality of line sensors; an original mover moving the original for the plurality of line sensors; a platen mover moving the platen for the plurality of line sensors; a detector detecting a noise pixel from original image data based on data output from the plurality of line sensors when the original and the platen move in opposite directions; a predictor predicting a location of a noise pixel that will be generated in the original image data output from the plurality of line sensors when the original and the platen move in the same direction based on a location of the noise pixel in the original image data detected with the detector; and a determiner determining whether the pixel at the location predicted is a noise pixel or not.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a perspective view of an MFP including an image reading apparatus in one embodiment of the present invention.

FIG. 5 is a rear plan view of the platen.

FIG. 6 shows a position on a platen read by a reader.

FIGS. 11A-11F show an edge extraction filter by way of example.

DESCRIPTION OF THE PREFERRED EMBODIMENTS

Figure 2:
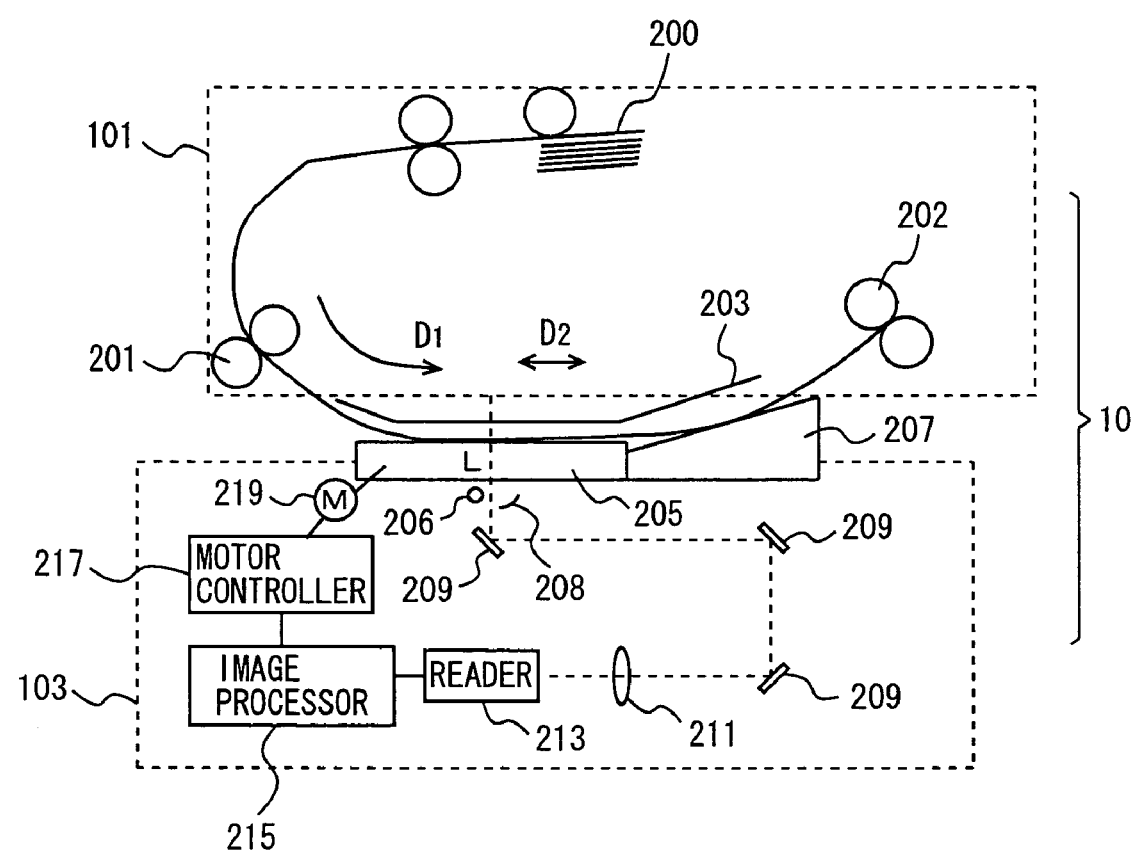
FIG. 2 schematically shows the image reading apparatus's internal structure.

Hereinafter reference will be made to the drawings to describe embodiments of the present invention. In the following description, like components are denoted by like reference characters and also identical in name and function.

FIG. 1 is a perspective view of a multi-function peripheral (MFP) including an image reading apparatus in one embodiment of the present invention. With reference to the figure, the MFP includes an image reading apparatus 10 operative to read an original image, and an image forming apparatus 20 provided under image reading apparatus 10. The MFP forms an image read by image reading apparatus 10 on a sheet of paper or similar recording medium. Furthermore, the MFP includes a communications interface to connect with a facsimile device, a local area network (LAN), a public line or similar network.

FIG. 2 schematically shows an internal configuration of image reading apparatus 10. Image reading apparatus 10 includes an automatic document feeder (ADF) 101 and a main body 103. ADF 101 includes an upper restraint plate 203 guiding a transported original in the vicinity of an original reading position, a timing roller pair 201 transporting the original to the original reading position, and a roller pair 202 transporting the original having moved past the reading position.

Main body 103 includes a platen 205 formed of a transparent member, a sheet passage guide 207 forming a portion of a path of the original, a source of light 206 illuminating the original at the reading position, a reflector member 208 reflecting the light emitted from the source of light, a reader 213 having three line sensors arranged in a sub scanning direction, a reflector mirror 209 arranged to reflect light reflected from the original and guide the reflection of light to reader 213, a lens 211 focusing the reflection of light on reader 213, an image processor 215 processing an electrical signal output from reader 213, a motor 219 operative to oscillate platen 205, and a motor controller 217 operative in response to a control signal received from image processor 215 to control the driving of motor 219.

An original 200 is transported by timing roller pair 201 between platen 205 and upper restraint plate 203 in a direction D1. The original being transported has its image read at a reading position L by reader 213 successively. ADF 101 transports an original in the sub scanning direction, as seen at a reading position L. During the image reading operation, platen 205 is oscillated by motor 219 in a direction D2. Platen 205 oscillates in a direction substantially parallel to the sub scanning direction.

Reader 213 includes three line sensors each having a plurality of photoelectric conversion elements arranged in a main scanning direction substantially perpendicular to the sub scanning direction. The three line sensors have filters, respectively, different in spectral sensitivity and receive light reflected from an original through the filters. More specifically, the sensors have filters transmitting light of waveforms of red (R), green (G) and blue (B). Thus, the line sensor having the filter of red (R) outputs an R signal, an electrical signal indicating an intensity of red light of light reflected from an original, the line sensor having the filter of green (G) outputs a G signal, an electrical signal indicating an intensity of green light of light reflected from the original, and the line sensor having the filter of blue (B) outputs a B signal, an electrical signal indicating an intensity of blue light of light reflected from the original.

The three line sensors are arranged in the sub scanning direction in a predetermined order with a predetermined distance therebetween. In this example, the line sensors are spaced by a distance corresponding to three original reading lines, and arranged, red first, followed by green and then blue as seen in the direction in which an original is transported, although the line sensors may be spaced by different distances and arranged in different orders.

The three line sensors thus spaced and arranged simultaneously receive at the same timing the light reflected by an original at different locations. As such, the light reflected by the original at a location is initially received by the red light receiving line sensor, subsequently by the green light receiving line sensor, and finally by the blue light receiving line sensor. This delay is adjusted by image processor 215, as will be described later.

Note that while in the present embodiment reader 213 is provided with three line sensors, it may be provided with four or more line sensors.

Figure 3:
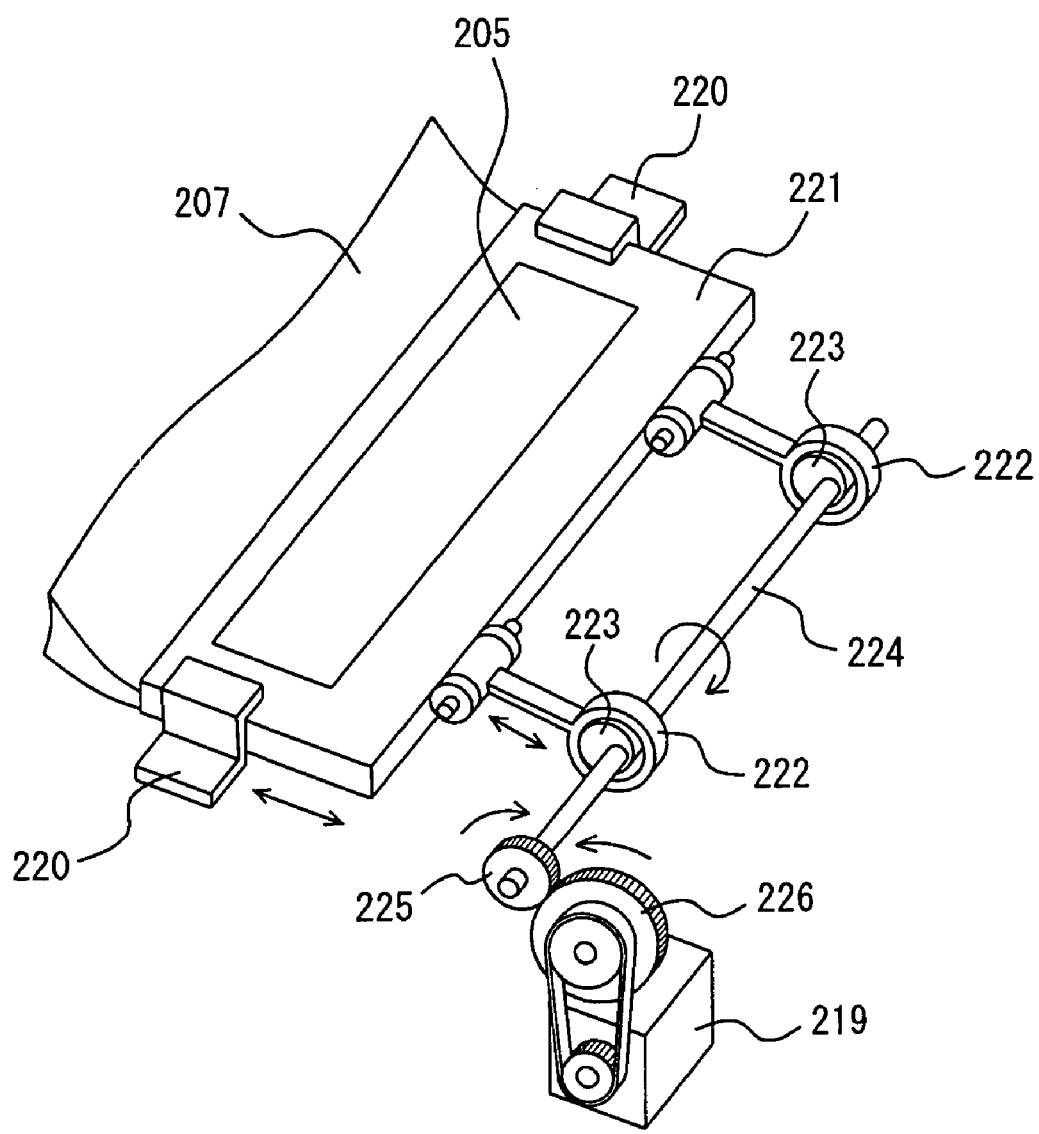
FIG. 3 is a perspective view of a mechanism employed to oscillate a platen.

FIG. 3 is a perspective view showing a mechanism employed to oscillate the platen. With reference to the figure, platen 205 is held by a platen holder 221 held slidably in the sub scanning direction by a guide 220 fixed to the main body of image reading apparatus 10. Platen holder 221 has one surface with two arms 222 connected thereto. Arm 222 has the other end provided with a circular hole.

A shaft 224 at portions corresponding to the two arms 222 has two cams 223 attached thereto. Furthermore, shaft 224 has one end with a gear 225 attached thereto. Gear 225 is arranged to mesh with a gear 226 linked by a belt to the motor 219 drive shaft. As motor 219 runs, the motor's rotation is transmitted by the belt to gear 226, and gear 226 thus rotates. As gear 226 rotates, gear 225 and shaft 224 rotate.

Cam 223 is arranged in the circular hole of arm 222. As such, as shaft 224 rotates, the two cams 223 accordingly provide rotation, which is converted to translation movement of platen holder 221.

Note that platen 205 may be oscillated by a mechanism other than that described above. For example, the platen may be oscillated by a mechanism employing a driving source, such as a piston utilizing an electromagnet, air pressure, hydraulic pressure and the like, causing linear movement.

Platen 205 is oscillated parallel to the sub scanning direction. When platen 205 is moving in a direction opposite that in which an original is transported, platen 205 and the original move in the opposite directions. As such, the speed of platen 205 relative to line sensors 213R, 213G, 213B and that of the original relative to the line sensors are different. In contrast, when platen 205 is moving in the direction in which the original is transported, the speed of platen 205 and that of the original transported are the same in direction. Preferably, they should be different in rate. Note that while herein platen 205 is oscillated parallel to the sub scanning direction, the platen may be oscillated in different directions.

Figure 4A:
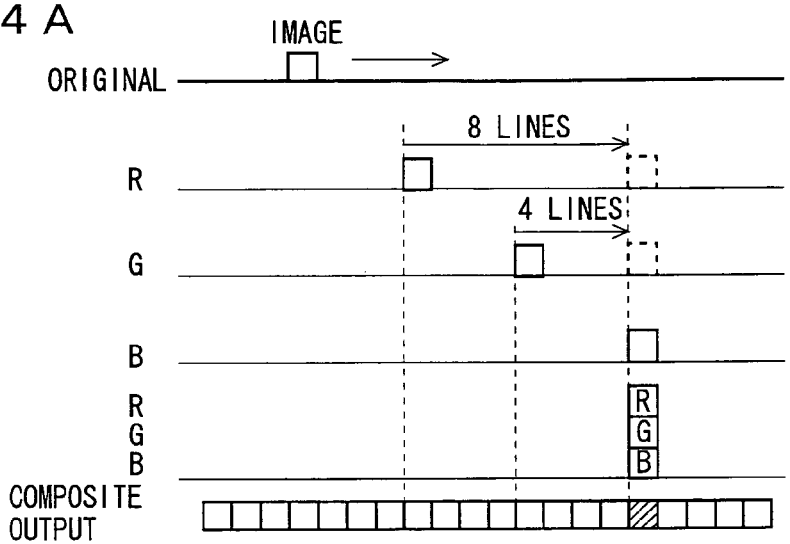
FIGS. 4A-4C are diagrams for illustrating a theory of detecting noise generated by reading dust from a read image.
Figure 4B:
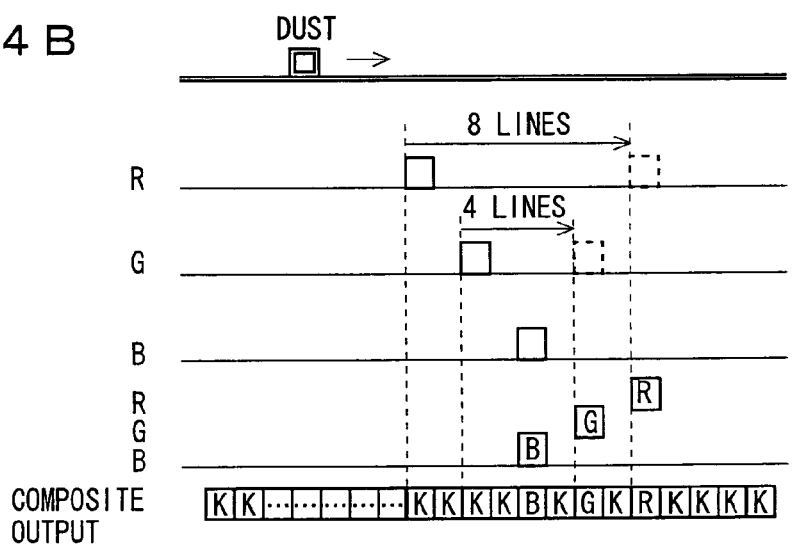
Figure 4C:
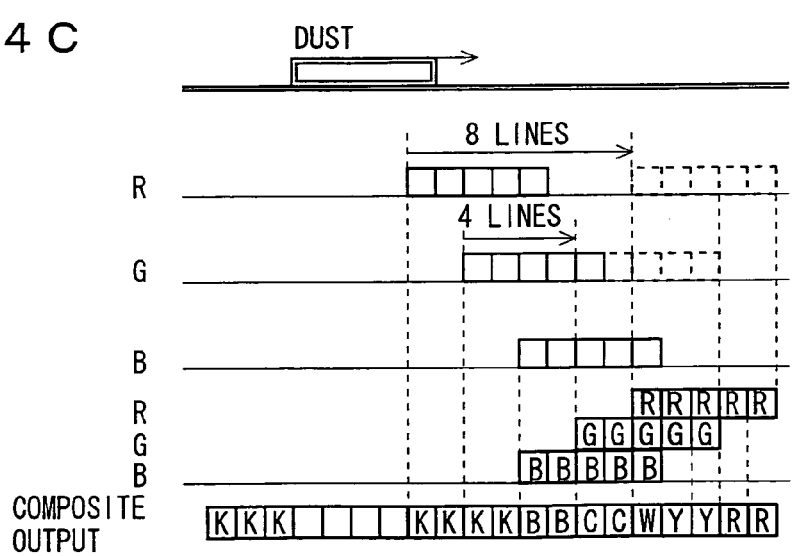

In the present embodiment image reading apparatus 10 detects noise generated by dust adhering on platen 205 from a read image in accordance with a theory as described hereinafter. FIGS. 4A-4C are diagrams for illustrating the theory. For the sake of illustration, an original and platen 205 are transported in the figures in a direction indicated by an arrow, and platen 205 moves at a rate which is the same in direction as and twice in magnitude that at which the original is transported. Furthermore for the sake of illustration the three line sensors are red light, green light and blue light receiving line sensors arranged red first, followed by green and then blue in the direction in which the original is transported, with a distance corresponding to three lines therebetween. R, G and B indicate outputs of the red light, green light and blue light receiving line sensors, respectively.

FIG. 4A is a diagram for illustrating interline correction. The image of a portion of the original is initially read by the red light receiving line sensor arranged most upstream in the direction in which the original is transported. The image is then transported by a distance corresponding to four lines, and read by the green light receiving line sensor. The image is further transported by a distance corresponding to four lines, and read by the blue light receiving sensor.

Thus an image located in an original at a single location is read by three line sensors at different times. As such, the three line sensors output signals offset in timing. Interline correction synchronizes the signals output from the three line sensors so that the signals all correspond to a single location in the original. More specifically, output R is delayed by eight lines and output G is delayed by four lines.

Interline corrected outputs R, G and B are composited to provide a composite output, which corresponds to outputs R, G and B read at a single location in an original and composited together.

FIG. 4B is a diagram for illustrating a composite output provided when dust adhering on a platen is read. The dust adhering on platen 205 is initially read by the red light receiving line sensor arranged most upstream in the direction in which an original is transported. The dust is transported by a distance corresponding to four lines, and read by the green light receiving line sensor. Since platen 205 moves in the same direction as the original at a rate twice that at which the original is transported, the dust moves by four lines in a period of time required for a line sensor to read the original by two lines. As such, between the time point at which the red line sensor reads the dust and that at which the green line sensor reads the dust there is introduced an offset by a period of time corresponding to reading two lines. Furthermore, the dust is transported by a distance corresponding to four lines, and read by the blue light receiving line sensor. Since platen 205 moves in the same direction as the original at a rate twice that at which the original is transported, between the time point at which the green line sensor reads the dust and that at which the blue line sensor reads the dust there is introduced an offset by a period of time corresponding to reading two lines.

By interline correction the red light receiving line sensor reading the dust outputs R delayed by eight lines and the green light receiving line sensor reading the dust outputs G delayed by four lines. As such, interline corrected outputs R, G and B composited together provide a composite output in which outputs R, G and B with the dust read are not composited at the same timing, offset by two lines.

Note that the figure shows a composite output provided when paper particles or similar white dust adhere on platen 205 and a black original is read. Despite that the white dust is read, the composite output is not white but rather an output of blue, green and red divided in three lines.

FIG. 4C is another diagram for illustrating a composite output provided when dust adhering on a platen is read. The figure shows an example of reading dust having a size corresponding to ten lines in the sub scanning direction. Platen 205 moves in the same direction as an original at a rate twice that at which the original is transported. As such, the dust is read as having a size corresponding to five lines.

The dust adhering on platen 205 is initially read by the red light receiving line sensor arranged most upstream in the direction in which the original is transported. The dust is then transported by a distance corresponding to four lines, and read by the green light receiving line sensor. Between the time point at which the red line sensor reads the dust and that at which the green line sensor reads the dust there is introduced an offset by a period of time corresponding to reading two lines. The dust further is transported by a distance corresponding to four lines, and read by the blue light receiving line sensor. Between the time point at which the green line sensor reads the dust and that at which the blue line sensor reads the dust there is introduced an offset by a period of time corresponding to reading two lines.

By interline correction the red light receiving line sensor reading the dust outputs R delayed by eight lines and the green light receiving line sensor reading the dust outputs G delayed by four lines. As such, interline corrected outputs R, G and B composited together provide a composite output in which outputs R, G and B by five lines with the dust read are not composited at the same timing, offset by two lines. Note that the figure shows a composite output provided when paper particles or similar white dust adhere on platen 205 and a black original is read. Despite that the white dust is read, the composite output is an output varying in color, first in blue, followed by cyan, white, yellow and then red.

The dust adhering on platen 205 is thus divided in an image into a plurality of lines, which are extracted for each color as a feature point to detect noise. Furthermore, such division also reduces noise caused by reading the dust.

FIG. 5 is a plan, rear view of the platen. With reference to the figure, platen 205 has one end with a mark 205A having a single color and a geometry having in the main scanning direction a length varying depending on the position in the sub scanning direction. In this description, mark 205A is a black triangle. Furthermore, mark 205A has one side arranged parallel to one side of platen 205.

Reader 213 or a sensor provided separate from reader 213 and fixed to main body 103 can be used to detect the length of mark 205A in the main scanning direction to detect the position of platen 205 relative to reader 213.

FIG. 6 shows a location on platen 205 read by reader 213. Reader 213 has line sensors 213R, 213G and 213B having filters of red (R), green (G) and blue (B), respectively, arranged in a direction in which an original is transported D1, red first, followed by green and then blue.

Line sensors 213R, 213G and 213B receive light transmitted through platen 205 at regions 205R, 205G and 205B, respectively. Regions 205R, 205G and 205B are arranged to be spaced by three lines. The original initially moves past region 205R, then region 205G and finally region 205B. As such, light reflected by the original at a location is initially received by the red light receiving line sensor 213R, then the green light receiving line sensor 213G, and finally the blue light receiving line sensor 213B. Line sensors 213R, 213G, 213B spaced by three lines thus will not simultaneously receive light reflected by the original at a single location.

If platen 205 has adhering thereto dust 300 having a maximal length of at most four lines, then dust 300 will not exist at two or more of regions 205R, 205G, 205B concurrently as platen 205 moves oscillating parallel to the sub scanning direction. FIG. 6 shows a case where dust 300 exists at region 205G. In this case, light reflected by dust 300 is received only by line sensor 213G and not received by line sensor 213R or 213B.

Furthermore, as platen 205 oscillates, dust 300 will exists at different regions. More specifically, when platen 205 moves in direction D1, dust 300 initially exists at region 205R, then region 205G and finally region 205B. In contrast, when platen 205 moves in a direction opposite direction D1, dust 300 exists initially at region 205B, then region 205G, and finally region 205R.

As such, light reflected by dust 300 is received in such an order that when platen 205 moves in direction D1 the light is received initially by line sensor 213R, then line sensor 213G and finally line sensor 213B and when platen 205 moves opposite to direction D1 the light is received initially by line sensor 213B, then line sensor 213G, and finally line sensor 213R.

Figure 7:
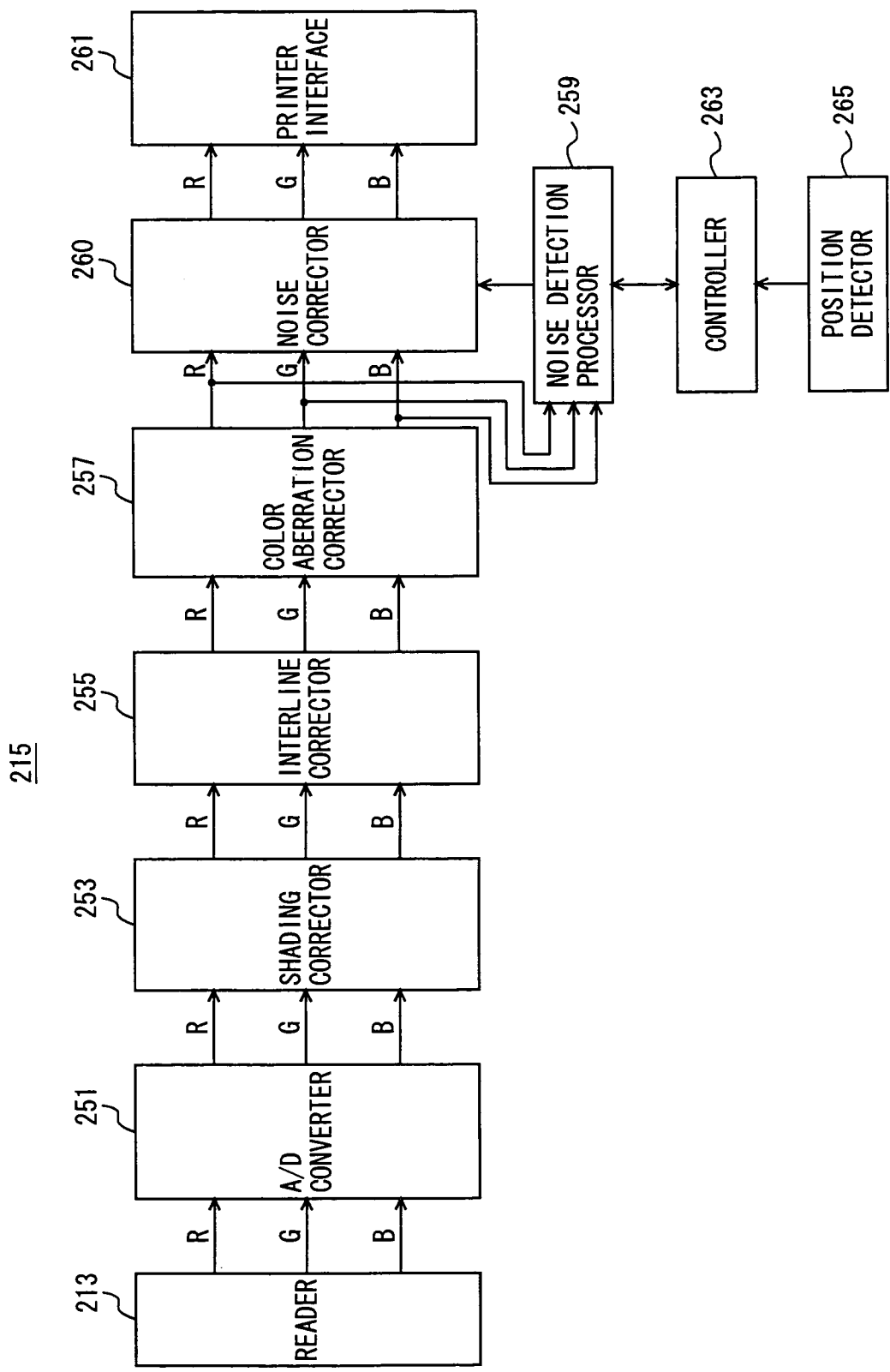
FIG. 7 is a block diagram showing a configuration of an image processor of the image reading apparatus in the present embodiment.

FIG. 7 is a block diagram showing a configuration of the image processor of the image reading apparatus in the present embodiment. With reference to the figure, image processor 215 receives R, G and B signals from reader 213. Image processor 215 includes an analog/digital (A/D) converter 251 receiving an analog signal from reader 213 to convert the analog signal to a digital signal, a shading corrector 253 correcting uneven illumination provided by the source of light 206 or the like, an interline corrector 255 synchronizing the R, G and B signals to be a single line of an original, a color aberration corrector 257 correcting distortion in the main scanning direction introduced by lens 211, a noise detection processor 259 detecting noise from each of the R, G and B signals, a noise corrector 260 effecting a process to correct a noise pixel, a controller 263 generally controlling image processor 215, and a printer interface 261 used to output an image to image forming apparatus 20. Controller 263 has a position detector 265 connected thereto to detect the position of platen 205. Position detector 265 detects a length of mark 205A of platen 205 in the main scanning direction.

Interline corrector 255 delays the R and G signals by eight and four lines, respectively, to synchronize the R, G and B signals to be a single line of the original, since as has been described previously, line sensors 213R, 213G, 213B are spaced in the sub scanning direction by a distance corresponding to three lines.

Noise detection processor 259 receives the R, G and B signals from color aberration corrector 257 and from controller 263 the position of platen 205 and a direction in which platen 205 moves. Noise detection processor 259 detects a noise pixel for each of the R, G and B signals received from color aberration corrector 257, and outputs to noise corrector 260 and controller 263 logical signals of "1" and "0" indicating a noise pixel and a pixel other than a noise pixel, respectively. The detail will be described later.

Noise corrector 260 receives the R, G and B signals from color aberration corrector 257 and from noise detection processor 259 receives for each of the R, G and B signals logical signal of "1" and "0" indicating a noise pixel and a pixel other than a noise pixel, respectively.

Noise corrector 260 determines from logical signals corresponding to the R, G and B signals, respectively, a color of a pixel determined as a noise pixel. More specifically, noise corrector 260 determines a color of a noise pixel successive in the sub scanning direction. Furthermore, if noise pixels are not successive in the sub scanning direction then a color of a pixel existing between two noise pixels is determined, and if the pixels are identically located in the main scanning direction and vary in color in the sub scanning direction in the following order:

(1) CBMRY or YRMBC
(2) CBKRY or YRKBC
(3) RYGCB or BCGYR
(4) RYWCB or BCWYR then the pixels are all determined as noise pixel, wherein R, G, B, C, M, Y, K, and W represent red, green, blue, cyan, magenta, yellow, black, and white, respectively. It should be noted, however, that herein an order in which a color varies is only indicated, and two or more pixels of the same color may be successively provided. For example, it may be CCBBM-MRRYY.

Thus if dust has a size read by a plurality of line sensors concurrently, herein a size corresponding to four or more lines, noise caused by reading the dust can be detected.

Furthermore, noise corrector 260 operates for each of the R, G and B signals in response to a logical signal corresponding thereto to replace a value of a pixel determined as a noise pixel with that of a neighboring, non-noise pixel. This can simply be done by replacing the value of the pixel determined as the noise pixel with an average, maximum or minimum value of a plurality of neighboring non-noise pixels. Noise corrector 260 outputs to the printer interface the R, G and B signals with any noise pixels replaced with a neighboring pixel(s).

Controller 263 receives the position of platen 205 from position detector 265 and from noise detection processor 259 logical signals of "1" and "0" indicating a noise pixel and a pixel other than noise pixel, respectively. Controller 263 determines from these signals the dust's location on platen 205. More specifically, it determines the position of platen 205 in the sub scanning direction from the position of platen 205 and a logical signal's line number, and the position of platen 205 in the main scanning direction from a location of a noise pixel of the logical signal.

The noise detection process will more specifically be described hereinafter. As has been described with reference to FIG. 6, line sensors 213R, 213G and 213B will read different locations on an original at the same timing. Interline corrector 255 synchronizes the R, G and B signals' lines to obtain R, G and B signals having read a single location on the original.

As such, if platen 205 has dust adhering thereon, R, G and B signals having read a single location on an original have one of them affected.

Figure 8:
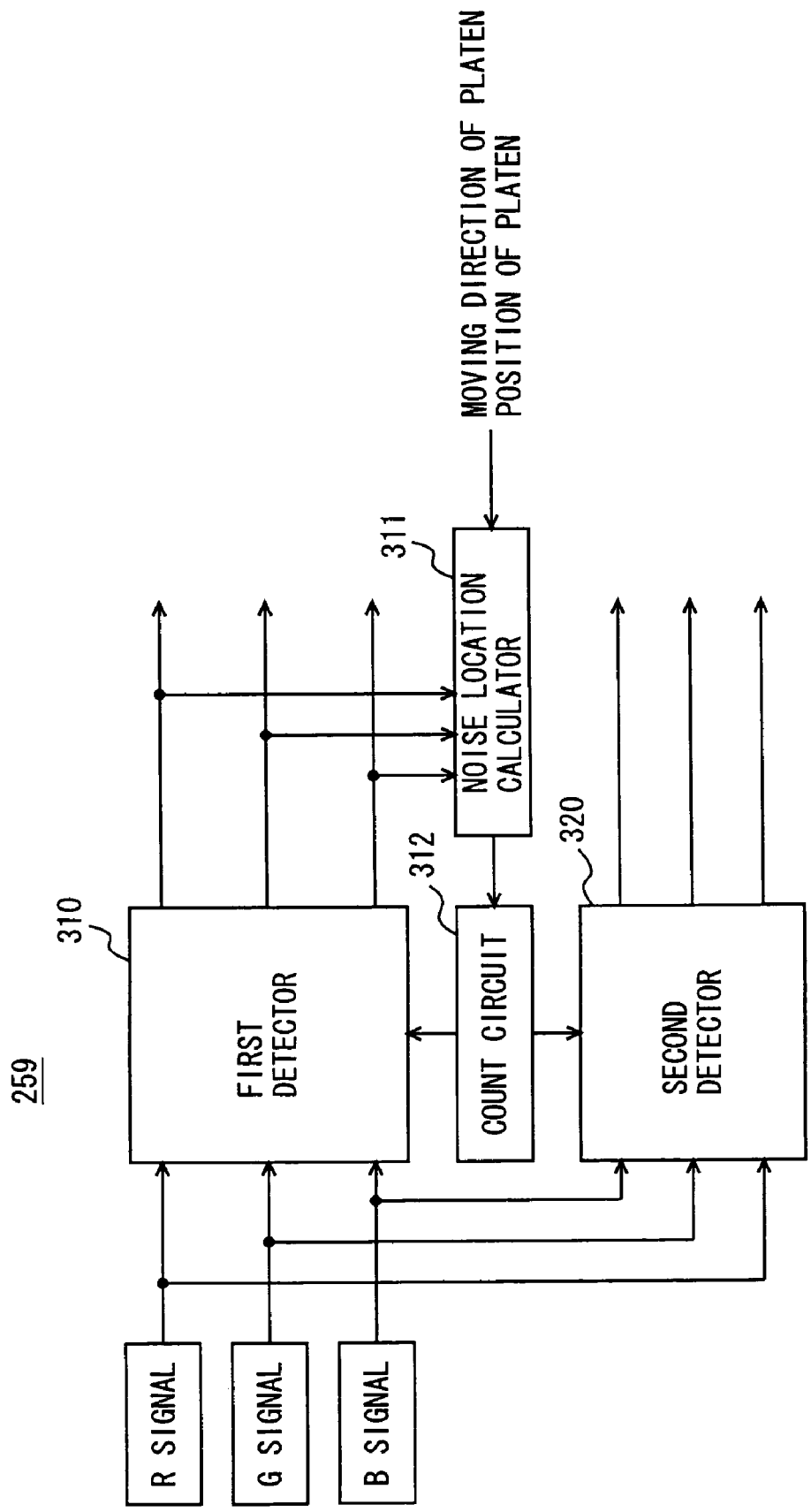
FIG. 8 is a block diagram showing a configuration of a noise detection processor of the image reading apparatus in the present embodiment.

FIG. 8 is a block diagram showing a configuration of the noise detection processor of the image reading apparatus in the present embodiment. With reference to the figure, noise detection processor 259 includes first detector 310 detecting a noise pixel from each of input R, G and B signals, a noise location calculator 311 calculating a location of a noise pixel which will be subsequently detected based on a location of the noise pixel which is detected, a count circuit 312 counting a number of lines to the location of a subsequent noise pixel input from noise location calculator 311, and a second detector 320 detecting a noise pixel from each of input R, G and B signals responsive to a detection instruction signal input from count circuit 312.

R, G and B signals are input to first detector 310, one line at a time, sequentially. First detector 310 detects a noise pixel from each of R, G and B signals for each input line. Details of first detector 310 will be described below. First detector 310 outputs logical signals of "1" and "0" respectively indicating a noise pixel and a pixel other than a noise pixel for each line corresponding to each of the R, G and B signals input. The logical signal corresponding to each of the R, G and B signals output from first detector 310 indicates the location of the noise pixel.

The logical signal corresponding to each RGB signal output from first detector 310 is input to noise location calculator 311. In noise location calculator 311, a location of the R signal in the sub scanning direction is specified from an order of input of the logical signal corresponding to the R signal, and a location of the R signal in the main scanning direction is specified from a location of the logical signal of a value "1" which indicates the noise pixel. In noise location calculator 311, a location of the G signal in the sub scanning direction is specified from an order of input of the logical signal corresponding to the G signal, and a location of the G signal in the main scanning direction is specified from a location of the logical signal of a value "1" which indicates the noise pixel. In noise location calculator 311, a location of the B signal in the sub scanning direction is specified from an order of input of the logical signal corresponding to the B signal, and a location of the B signal in the main scanning direction is specified from a location of the logical signal of a value "1" which indicates the noise pixel. When the logical signals corresponding to the R signal are input for 10 lines, for example, the location is determined to be on a 10th line. That is, the location of the noise pixel is specified with the location in the sub scanning direction which is specified by a line number and the location in the main-scanning direction which is specified by a pixel number. As described above, the location of the noise pixel detected in first detector 310 is input from first detector 310 to noise location calculator 311 for each RGB signal.

A moving direction and a position of the platen are input from controller 263 to noise location calculator 311. Noise location calculator 311 calculates a location of a pixel on which a noise pixel will be subsequently detected (hereafter referred to as a "predicted location") from the position and moving direction of platen 205 at a time of input of the logical signal including the noise pixel from first detector 310.

When the location of the noise pixel is input from first detector 310 with the logical signal for the R signal while platen 205 is moving in a direction opposite that in which the original is transported, a subsequent noise signal should be generated in the R signal when platen 205 next comes to the position, provided that the dust does not move on platen 205. When a noise pixel is detected with first detector 310, second detector 320 calculates a time taken until platen 205 next comes to the same position. Then, it is possible to calculate a line on which a noise pixel will be subsequently generated from the time calculated and a scanning speed of image reading apparatus 10. Noise location calculator 311 outputs the predicted location corresponding to each of the R, G and B signals to count circuit 312.

Line sensors 213R, 213G, 213B are arranged in the sub scanning direction with a fixed spacing. In this embodiment, they are arranged with a spacing of 4 lines. Therefore, noise location calculator 311 can calculate a location of a subsequently generated noise pixel for every signal from a location of a noise pixel detected from one signal. The subsequently generated noise pixel mentioned here is a pixel corresponding to the noise pixel which is detected while platen 205 is moving in a direction opposite that in which the original is transported, which pixel will be detected as a noise pixel while platen 205 is moving in the direction in which the original is transported. The location of the noise pixel on which calculation of a location of a predicted pixel is based may be for any of R, G and B signals. B signal is preferable because a noise pixel is initially detected from the B signal while platen 205 is moving in the direction opposite that in which the original is transported.

From the location of the noise pixel detected from the B signal while platen 205 is moving in the direction opposite that in which the original is transported, for example, the predicted location of a noise pixel which will be detected from each of R, G and B signals can be calculated.

The predicted location of a subsequent noise pixel in each of R, G and B signals is input from noise location calculator 311 to count circuit 312. The predicted location includes a location of a line and a location of a noise pixel in the line. The location of a line is specified with a line number. The location of a noise pixel is specified with logical signals of "1" and "0" indicating a noise pixel and a pixel other than a noise pixel, respectively. Count circuit 312 counts a number of lines until the R signal of the line number of the predicted location is input to noise detection processor 259. When the R signal of the line number of the predicted location is input to noise detection processor 259, a detection signal for the R signal is output to second detector 320. The detection signal includes the location of the noise pixel. The detection signal includes logical signals of "1" and "0" indicating a noise pixel and a pixel other than a noise pixel, respectively. That is, the detection signal specifies the predicted location in the sub scanning direction by an output timing thereof, and specifies the predicted location in the main scanning direction by the logical signals.

Count circuit 312 also counts a number of lines until the G signal of the line number of the predicted location is input to noise detection processor 259. When the G signal of the line number of the predicted location is input, a detection signal for the G signal is output to second detector 320. Furthermore, count circuit 312 counts a number of lines until the B signal of the line number of the predicted location is input to noise detection processor 259. When the B signal of the line number of the predicted location is input, a detection signal for the B signal is output to second detector 320.

R, G and B signals are sequentially input to second detector 320, one line at a time, similarly as first detector 310. Detection signals for R, G and B signals are input from count circuit 312 to second detector 320. Second detector 320 detects a noise pixel from the R signal input responsive to input of the detection signal for the R signal. Second detector 320 also detects a noise pixel from the G signal input responsive to input of the detection signal for the G signal. Second detector 320 further detects a noise pixel from the B signal input responsive to input of the detection signal for the B signal.

Second detector 320 detects a noise pixel with a method different from that for first detector 310. Details of second detector 320 will be described below. Second detector 320 outputs logical signals of "1" and "0" respectively indicating a noise pixel and a pixel other than a noise pixel for each of the R, G and B signals input for each line responsive to input of the detection signal for the R signal.

When platen 205 moves in the direction in which the original is transported, a moving speed of platen 205 may become equal to a transporting speed of the original. Though first detector 310 cannot detect a noise pixel from any of the R, G and B signals in this situation, second detector 320 can detect a noise pixel because it detects a noise pixel with a method different from that for first detector 310.

Noise detection processor 259 detects a noise pixel with first detector 310 and second detector 320, and outputs an OR of the logical signals output from first detector 310 and second detector 320. That is, a pixel is set as a noise pixel if first detector 310 or second detector 320 determines that the pixel is a noise pixel.

<First Detector>

Figure 9:
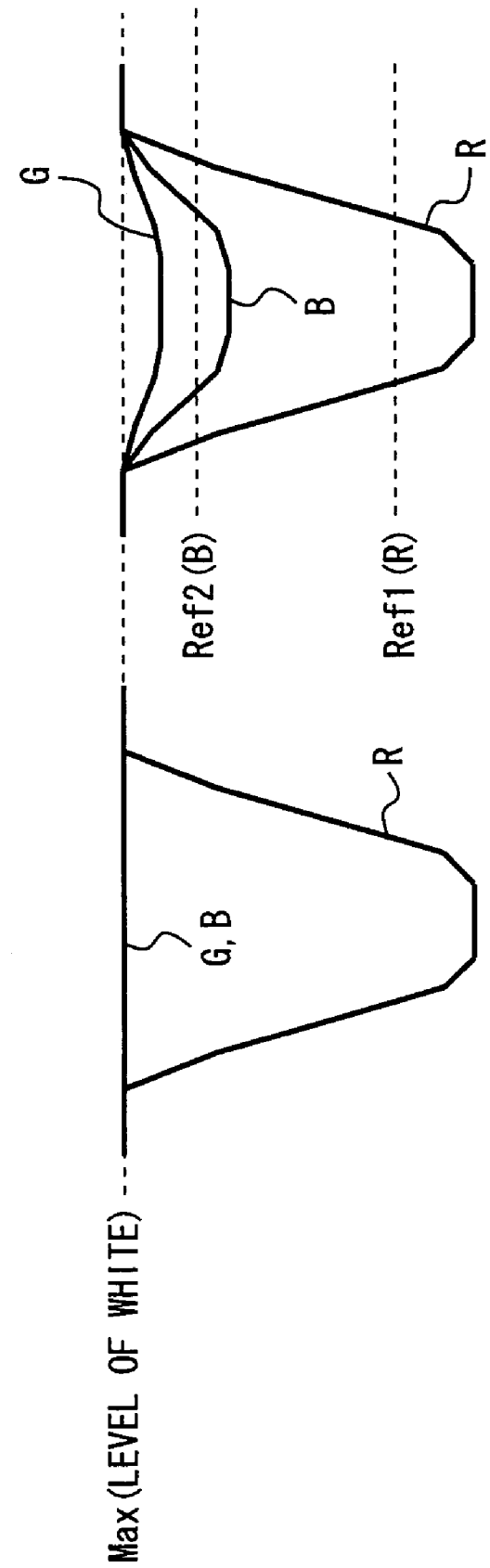
FIGS. 9A and 9B represent one example of RGB signal output from the reader.

FIGS. 9A and 9B represent an example of RGB signal output from the reader. FIG. 9A shows an example of reading a white area of an original with black dust adhering on the platen's region 205R corresponding to line sensor 213R. Line sensor 213R reads a portion of the original with the black dust on region 205R. Subsequently, the portion of the original moves to regions 205G, 205B corresponding to line sensors 213G, 213B, when the dust does not exist on regions 205G, 205B, since the original and platen 205 moves at different rates. As such line sensors 213G, 213B will read the original's white area. Consequently, only an R signal output from line sensor 213R is reduced in lightness and line sensors 213G, 213B output G and B signals high in lightness. Note that herein, "lightness" indicates a value output from the three line sensors 213R, 213G, 213B corresponding to a reflection of light.

The FIG. 9A RGB signals' combination is seldom output when an original is read without dust adhering thereto. A combination closest thereto is a case where an area of cyan, a color complementary to red, is read. FIG. 9B represents RGB signal output from reader 213 when an original's cyan area is read. The R signal significantly drops in lightness, and the G and B signals also drops in lightness. As such, the variation in lightness of the R signal significantly dropping in lightness can be detected by using a threshold value Red1(R).

The FIG. 9A RGB signal and the FIG. 9B RGB signal are significantly different in whether the B and G signals are affected. By detecting this difference, black dust can be detected as noise without detecting a cyan line erroneously as noise. As such, the B signal's variation in lightness is detected by using a threshold value Ref2(B). Threshold value Ref2(B) can simply be provided by the smallest one of the following values. Hereinafter, threshold values Ref2(R), Ref2(G), Ref2(B) are indicated.

(1) Detecting Dust of Achromatic Color High in Lightness

To prevent a cyan line from being detected erroneously as noise, the difference between a maximum value in lightness (255) and one of the values in lightness output from the line sensors other than line sensor 213R, i.e., line sensors 213G and 213B, reading a color complementary to red, or cyan, can be set as Ref2(G), Ref2(B). To prevent a magenta line from being detected erroneously as noise, the difference between the maximum value in lightness (255) and one of the values in lightness output from the line sensors other than line sensor 213G, i.e., line sensors 213R and 213B, reading a color complementary to green, or magenta, can be set as Ref2(R), Ref2(B). To prevent a yellow line from being detected erroneously as noise, the difference between the maximum value in lightness (255) and one of the values in lightness output from the line sensors other than line sensor 213B, i.e., line sensors 213R and 213G, reading a color complementary to blue, or yellow, can be set as Ref2(R), Ref2(G).

(2) Detecting Dust of Achromatic Color Low in Lightness

To prevent a red line from being detected erroneously as noise, the difference between a minimum value in lightness (0) and one of the values in lightness output from the line sensors other than line sensor 213R, i.e., line sensors 213G and 213B, reading red color, can be set as Ref2(G), Ref2(B). To prevent a green line from being detected erroneously as noise, the difference between the minimum value in lightness (0) and one of the values in lightness output from the line sensors other than line sensor 213G, i.e., line sensors 213R and 213B, reading green color, can be set as Ref2(R), Ref2(B). To prevent a blue line from being detected erroneously as noise, the difference between the minimum value in lightness (0) and one of the values in lightness output from the line sensors other than line sensor 213B, i.e., line sensors 213R and 213G, reading blue color, can be set as Ref2(R), Ref2(G).

Thus more than one threshold value Ref2(R), Ref2(G), Ref2(B) are obtained, and a minimum value thereof can simply be used.

While herein black dust is detected as noise, dust of achromatic color other than black can also be detected, since any achromatic dust affects all of R, G and B signals.

Furthermore, while herein a white original is read by way of example, an original of any color other than white may be read.

Figure 10:
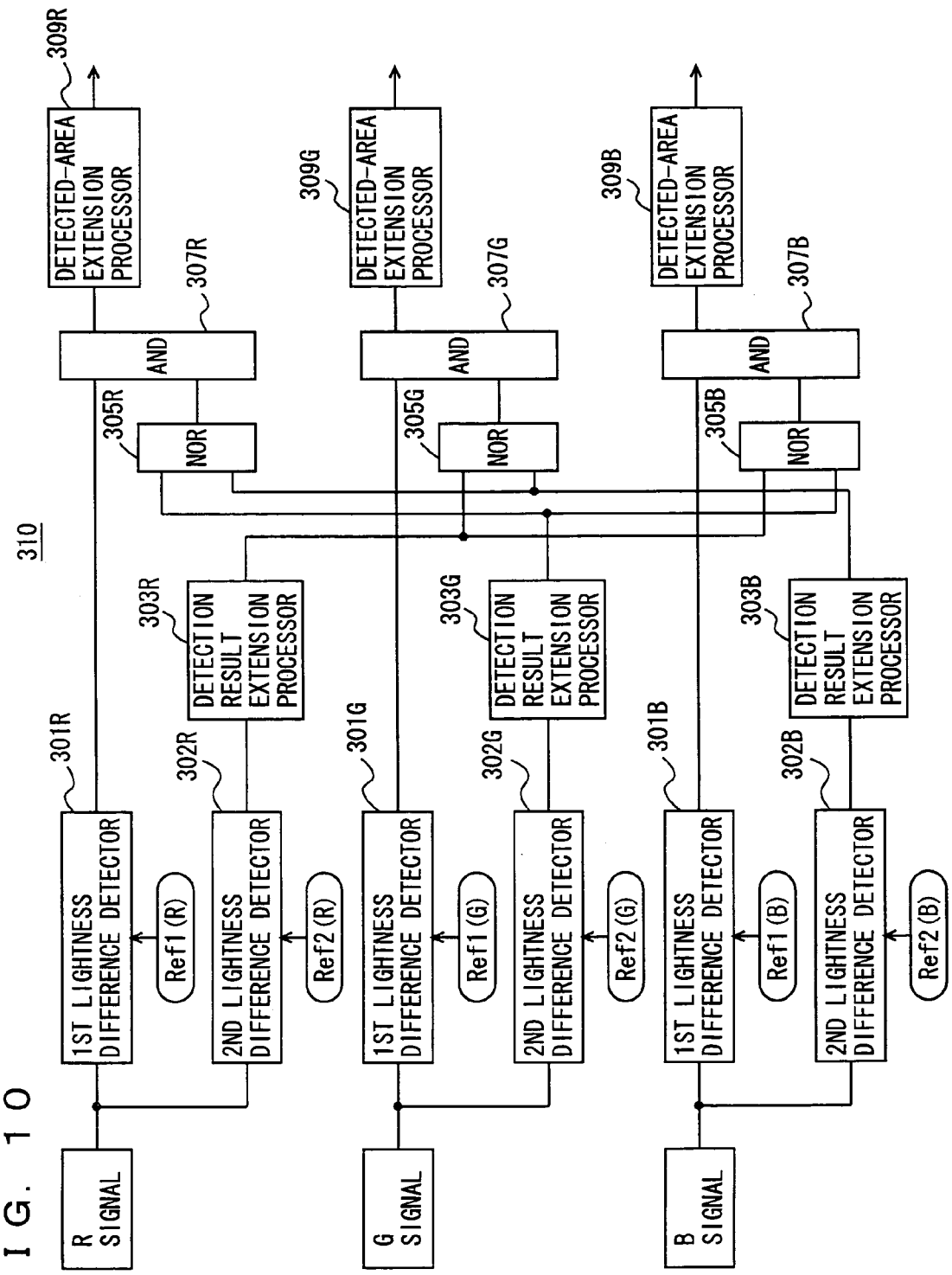
FIG. 10 is a block diagram showing a configuration of a first detector of the noise detection processor.

FIG. 10 is a block diagram showing a configuration of the first detector of the noise detection processor. With reference to FIG. 10, first detector 310 includes first lightness difference detectors 301R, 301G, 301B extracting from R, G and B signals, respectively, a region having a predetermined feature, second lightness difference detectors 302R, 302G, 302B extracting from R, G and B signals, respectively, a region having the predetermined feature, detection result extension processors 303R, 303G, 303B extending the region extracted by the second lightness detectors 302R, 302G, 302B to a vicinity thereof, NOR devices 305R, 305G, 305B, AND devices 307R, 307G, 307B, and detected-area extension processors 309R, 309G, 309B.

R, G, B signals are input to first detector 310, one line at a time, sequentially. Note that the R, G and B signals may be input collectively by a plurality of lines or an entire image.

The first lightness difference detector 301R receives the R signal and threshold value Ref1(R) and extracts from the R signal a region having the predetermined feature of a first level. This region is a region having a limited variation in lightness and a difference in lightness of at least threshold Ref1(R) from a region surrounding it. Such region is only required to have a size of at least one pixel. In this description a pixel included in a region having the predetermined feature of the first level will be referred to as a first feature pixel.

The region having the predetermined feature of the first level may be extracted by employing an edge extraction filter. More than one edge extraction filter are prepared for sizes of edge regions, respectively, and a value obtained as a result of filtering is compared with threshold value Ref1(R). A pixel satisfying a condition with threshold value Ref1(R) is determined as a center pixel of an edge region and from an edge extraction filter satisfying that condition the edge region's size is obtained.

FIGS. 11A-11F represent the edge extraction filter by way of example. FIG. 11A represents an edge extraction filter used to detect an edge region of a size of one pixel when an R signal is input, one line at a time. FIG. 11B represents an edge extraction filter used to detect an edge region of a size of one pixel when an R signal is input in a plurality of lines correctively.

FIG. 11C represents an edge extraction filter used to detect an edge region of a size of three pixels when an R signal is input, one line at a time. FIG. 11D represents an edge extraction filter used to detect an edge region of a size of three pixels when an R signal is input in a plurality of lines correctively.

FIG. 11E represents an edge extraction filter used to detect an edge region of a size of five pixels when an R signal is input, one line at a time. FIG. 11F represents an edge extraction filter used to detect an edge region of a size of five pixels when an R signal is input in a plurality of lines correctively.

These edge extraction filters are established under the following conditions:

(1) An edge region high in lightness is extracted when an average in lightness of pixels A and B minus that in lightness of pixel C equals at least threshold value Ref1(R):

(Average of Pixels $A$ and $B$)−(Average of Pixel $C$)>Ref1($R$).

In that case, the center pixel is one of pixels A, B and C that is the highest in lightness.

(2) An edge region low in lightness is extracted when an average in lightness of pixel C minus that in lightness of pixels A and B equals at least threshold value Ref1(R):

(Average of Pixel $C$)−(Average of Pixels $A$ and $B$)>Ref1($R$).

In that case, the center pixel is one of pixels A, B and C that is the lowest in lightness.

G and B signals can also be handled with an edge extraction filter similar to that used for the R signal.

The first lightness difference detectors 301R, 301G, 301B compare a value calculated by the above described edge extraction filter with threshold values Ref1(R), Ref1(G), Ref1 (B).

With reference again to FIG. 10, the first feature pixel extracted by the first lightness difference detector 301R is represented by a logical signal of "1" and a pixel other than the first feature pixel is represented by a logical signal of "0" and thus output to AND device 307R.

The second lightness difference detector 302R receives the R signal and threshold value Ref2(R) and extracts from the R signal a region having the predetermined feature of a second level. This region is a region having a limited variation in lightness and a difference in lightness of at least threshold Ref2(R) from a region surrounding it. Such region is only required to have a size of at least one pixel. In this description a pixel included in a region having the predetermined feature of the second level will be referred to as a second feature pixel. It should be noted that threshold value Ref2(R) is a smaller value than threshold value Ref1(R).

The region having the predetermined feature of the second level may be extracted by employing an edge extraction filter. More than one edge extraction filter are prepared for sizes of edge regions, respectively, and a value obtained as a result of filtering is compared with threshold value Ref2(R). A pixel satisfying a condition with threshold value Ref2(R) is determined as a center pixel of an edge region and from an edge extraction filter satisfying that condition the edge region's size is obtained.

The second lightness difference detectors 302R, 302G, 302B compare a value calculated by the above described edge extraction filter with threshold values Ref2(R), Ref2(G), Ref2 (B).

The second feature pixel extracted by the second lightness difference detector 302R is represented by a logical signal of "1" and a pixel other than the second feature pixel is represented by a logical signal of "0" and thus output to detection result extension processor 303R.

Detection result extension processor 303R sets a pixel neighboring the second feature pixel extracted by the second lightness difference detector 302R as a second feature pixel to extend a region having the predetermined feature of the second level. In other words, a pixel that exists in a vicinity of a pixel of "1" in value as represented by a logical signal received from the second lightness difference detector 302R and has a value of "0" is changed to "1". Noise can be detected with higher precision. A logical signal having contributed to extended region is output to NOR devices 305G, 305B.

The first lightness difference detector 301G receives the G signal and threshold value Ref1(G) and extracts from the G signal a region having the predetermined feature of the first level. This region is a region having a limited variation in lightness and a difference in lightness of at least threshold Ref1(G) from a region surrounding it.

The region having the predetermined feature of the first level may be extracted by employing an edge extraction filter. More than one edge extraction filter are prepared for sizes of edge regions, respectively, and a value obtained as a result of filtering is compared with threshold value Ref1(G). A pixel satisfying a condition with threshold value Ref1(G) is determined as a center pixel of an edge region and from an edge extraction filter satisfying that condition the edge region's size is obtained.

The feature pixel extracted by the first lightness difference detector 301G is represented by a logical signal of "1" and a pixel other than the first feature pixel is represented by a logical signal of "0" and thus output to AND device 307G.

The second lightness difference detector 302G receives the G signal and threshold value Ref2(G) and extracts from the G signal a region having the predetermined feature of the second level. This region is a region having a limited variation in lightness and a difference in lightness of at least threshold Ref2(G) from a region surrounding it. Such region is only required to have a size of at least one pixel. In this description a pixel included in a region having the predetermined feature of the second level will be referred to as a second feature pixel. It should be noted that threshold value Ref2(G) is a smaller value than threshold value Ref1(G).

The region having the predetermined feature of the second level may be extracted by employing an edge extraction filter. More than one edge extraction filter are prepared for sizes of edge regions, respectively, and a value obtained as a result of filtering is compared with threshold value Ref2(G). A pixel satisfying a condition with threshold value Ref2(G) is determined as a center pixel of an edge region and from an edge extraction filter satisfying that condition the edge region's size is obtained.

The second feature pixel extracted by the second lightness difference detector 302G is represented by a logical signal of "1" and a pixel other than the second feature pixel is represented by a logical signal of "0" and thus output to detection result extension processor 303G.

Detection result extension processor 303G sets a pixel neighboring the second feature pixel extracted by the second lightness difference detector 302G as a second feature pixel to extend a region having the predetermined feature of the second level. A logical signal having contributed to an extended region is output to NOR devices 305R, 305B.

The first lightness difference detector 301B receives the B signal and threshold value Ref1(B) and extracts from the B signal a region having the predetermined feature of the first level. This region is a region having a limited variation in lightness and a difference in lightness of at least threshold Ref1(B) from a region surrounding it.

The region having the predetermined feature of the first level may be extracted by employing an edge extraction filter. More than one edge extraction filter are prepared for sizes of edge regions, respectively, and a value obtained as a result of filtering is compared with threshold value Ref1(B). A pixel satisfying a condition with threshold value Ref1(B) is determined as a center pixel of an edge region and from an edge extraction filter satisfying that condition the edge region's size is obtained.

The feature pixel extracted by the first lightness difference detector 301B is represented by a logical signal of "1" and a pixel other than the first feature pixel is represented by a logical signal of "0" and thus output to AND device 307B.

The second lightness difference detector 302B receives the B signal and threshold value Ref2(B) and extracts from the B signal a region having the predetermined feature of the second level. This region is a region having a limited variation in lightness and a difference in lightness of at least threshold Ref2(B) from a region surrounding it. Such region is only required to have a size of at least one pixel. In this description a pixel included in a region having the predetermined feature of the second level will be referred to as a second feature pixel. It should be noted that threshold value Ref2(B) is a smaller value than threshold value Ref1(B).

The region having the predetermined feature of the second level may be extracted by employing an edge extraction filter.

More than one edge extraction filter are prepared for sizes of edge regions, respectively, and a value obtained as a result of filtering is compared with threshold value Ref2(B). A pixel satisfying a condition with threshold value Ref2(B) is determined as a center pixel of an edge region and from an edge extraction filter satisfying that condition the edge region's size is obtained.

The second feature pixel extracted by the second lightness difference detector 302B is represented by a logical signal of "1" and a pixel other than the second feature pixel is represented by a logical signal of "0" and thus output to detection result extension processor 303B.

Detection result extension processor 303B sets a pixel neighboring the second feature pixel extracted by the second lightness difference detector 302B as a second feature pixel to extend a region having the predetermined feature of the second level. A logical signal having contributed to an extended region is output to NOR devices 305R, 305G.

NOR device 305R receives from each of detection result extension processor 303G, 303B a logical signal having contributed to an extended region. NOR device 305R outputs to AND device 307R a logical signal corresponding to an inversion of an OR of two received logical signals. More specifically, a pixel which is not a second feature pixel for either a G or B signal is represented by a logical signal of "1" for output and a pixel which is a second feature pixel for at least one of the signals is represented by a logical signal of "0" for output.

AND device 307R outputs to detected-area extension processor 309R an AND of a logical signal received from the first lightness difference detector 301R and that received from NOR device 305R. More specifically, a pixel which is a first feature pixel for an R signal and not an extended second feature pixel for either a B or G signal is represented by a logical signal of "1" and a pixel different therefrom is represented by a logical signal of "0" for output. A pixel of "1" in value as represented by this logical signal indicates a noise pixel. Thus by NOR device 305R and AND device 307R a first feature pixel extracted from an R signal that has not been extracted as a second feature pixel for either a G or B signal is determined as a noise pixel.

If detected-area extension processor 309R receives a logical signal of "1" from AND device 307R for a pixel, detected-area extension processor 309R sets a pixel that exists in a vicinity of the pixel corresponding to the "1" to a "1" to extend a noise pixel's range. This is done to provide improved precision with which a noise pixel is corrected. The noise pixel extended in range is represented by a logical signal of "1" which is in turn output to noise corrector 260.

NOR device 305G receives from each of detection result extension processors 303R, 303B a logical signal having contributed to an extended region. NOR device 305G outputs to AND device 307G a logical signal corresponding to an inversion of an OR of two received logical signals. More specifically, a pixel which is not a second feature pixel for either an R or B signal is represented by a logical signal of "1" for output and a pixel which is a second feature pixel for at least one of the signals is represented by a logical signal of "0" for output.

AND device 307G outputs to detected-area extension processor 309G an AND of a logical signal received from the first lightness difference detector 301G and that received from NOR device 305G. More specifically, a pixel which is a first feature pixel for a G signal and not an extended second feature pixel for either a R or B signal is represented by a logical signal of "1" and a pixel different therefrom is represented by a logical signal of "0" for output. A pixel of "1" in value as represented by this logical signal indicates a noise pixel. Thus by NOR device 305G and AND device 307G a first feature pixel extracted from a G signal that has not been extracted as a second feature pixel for either an R or B signal is determined as a noise pixel.

If detected-area extension processor 309G receives a logical signal of "1" from AND device 307G for a pixel, detected-area extension processor 309G sets a pixel that exists in a vicinity of the pixel corresponding to the "1" to a "1" to extend a noise pixel's range. This is done to provide improved precision with which a noise pixel is corrected. The noise pixel extended in range is represented by a logical signal of "1" which is in turn output to noise corrector 260.

NOR device 305B receives from each of detection result extension processors 303R, 303G a logical signal having contributed to an extended region. NOR device 305B outputs to AND device 307B a logical signal corresponding to an inversion of an OR of two received logical signals. More specifically, a pixel which is not a second feature pixel for either an R or G signal is represented by a logical signal of "1" for output and a pixel which is a second feature pixel for at least one of the signals is represented by a logical signal of "0" for output.

AND device 307B outputs to detected-area extension processor 309B an AND of a logical signal received from the first lightness difference detector 301B and that received from NOR device 305B. More specifically, a pixel which is a first feature pixel for a B signal and not an extended second feature pixel for either an R or G signal is represented by a logical signal of "1" and a pixel different therefrom is represented by a logical signal of "0" for output. A pixel of "1" in value as represented by this logical signal indicates a noise pixel. Thus by NOR device 305B and AND device 307B a first feature pixel extracted from a B signal that has not been extracted as a second feature pixel for either an R or G signal is determined as a noise pixel.

If detected-area extension processor 309B receives a logical signal of "1" from AND device 307B for a pixel, detected-area extension processor 309B sets a pixel that exists in a vicinity of the pixel corresponding to the "1" to a "1" to extend a noise pixel's range. This is done to provide improved precision with which a noise pixel is corrected. The noise pixel extended in range is represented by a logical signal of "1" which is in turn output to noise corrector 260.

Thus first detector 310 extracts the first and second feature pixels from each of R, G and B signals output from the three line sensors 213R, 213G, 213B, and sets as a noise pixel the following pixels:

(1) a pixel which is extracted as a first feature pixel from an R signal and is not extracted as a second feature pixel from a G or B signal;

(2) a pixel which is extracted as a first feature pixel from a G signal and is not extracted as a second feature pixel from an R or B signal; and (3) a pixel which is extracted as a first feature pixel from a B signal and is not extracted as a second feature pixel from an R or G signal.

Thus noise caused by dust existing on a platen can be detected from an image obtained by reading an original.

<Second Detector>

R, G, B signals are input to second detector 320, one line at a time, sequentially. Furthermore, detection signals for the R, G, B signals are input from count circuit 312 to second detector 320. As a method of detection is same for any of the R, G, B signals, an example of the detection signal for the R signal input from count circuit 312 will be described here.

Second detector 320 extracts an edge region having the same size as that of an edge region detected immediately before with first detector 310. When such edge region is extracted, a pixel included in the edge region is determined as a noise pixel. More specific description will be given below.

(1) The detection signal is input from the count circuit to second detector 320. The detection signal corresponds to a pixel of the R signal and includes logical signals of "1" and "0" indicating a noise pixel and a pixel other than a noise pixel, respectively. Second detector 320 specifies from the logical signals included in the detection signal a number of successive noise pixel and a center pixel thereof, and selects from the edge extraction filters shown in FIGS. 11A-11F the edge extraction filter corresponding to the number of successive noise pixel. That is, the edge extraction filter for detecting a noise pixel of one pixel (FIG. 11A) is selected when there is one successive noise pixel, while the edge extraction filter for detecting a noise pixel of successive 3 pixels (FIG. 11C) is selected when there are 3 successive noise pixels, and the edge extraction filter for detecting a noise pixel of successive 5 pixels (FIG. 11E) is selected when there are 5 successive noise pixels.

(2) Second detector 320 executes edge extraction processing for the R signal input using the edge extraction filter selected. When the edge region is extracted, a pixel included in a region defined with the center pixel and a size of the edge extraction filter is represented by a logical signal of "1" and a pixel different therefrom is represented by a logical signal of "0" for output.

As described above, second detector 320 uses the edge extraction filter which was used to detect a noise pixel with the first detector, and determines a noise pixel when the edge region is extracted. In other words, when a number of successive edge pixel detected is substantially the same as a number of successive edge pixel detected with first detector 310, then the edge pixel is determined as a noise pixel. Therefore, since second detector 320 detects a noise pixel using a single edge extraction filter, it detects a noise pixel with a simple method as compared with that for first detector 310 using a plurality of edge extraction filters.

<Modified Example of Second Detector>

Each of a noise pixel detected with first detector 310 and a pixel at the location predicted with count circuit 312 has a value obtained by receiving light reflected from a dust on platen 205 at line sensors 203R, 204G, 203B. Therefore, the two pixels should have similar lightness. As a method of detection is same for any of the R, G, B signals, an example of the detection signal for the R signal input from count circuit 312 will be described here.

(1) The detection signal is input from the count circuit to second detector 320. The detection signal includes the R signal in which a noise pixel is detected with first detector 310, and logical signals of "1" and "0" respectively indicating a noise pixel and a pixel other than a noise pixel corresponding to a pixel of the R signal for each line.

(2) Second detector 320 compares an input R signal with the R signal included in the detection signal for every pixel having the logical signal of "1" included in the detection signal. When a difference in lightness of two pixels is smaller than a predetermined value or when the two pixels have substantially the same lightness, a logical signal of "1" representing a value of a corresponding pixel of the input R signal and a logical signal of "0" representing a value of a pixel different therefrom are output.

<Modified Example of Noise Detection Processor>

Figure 12:
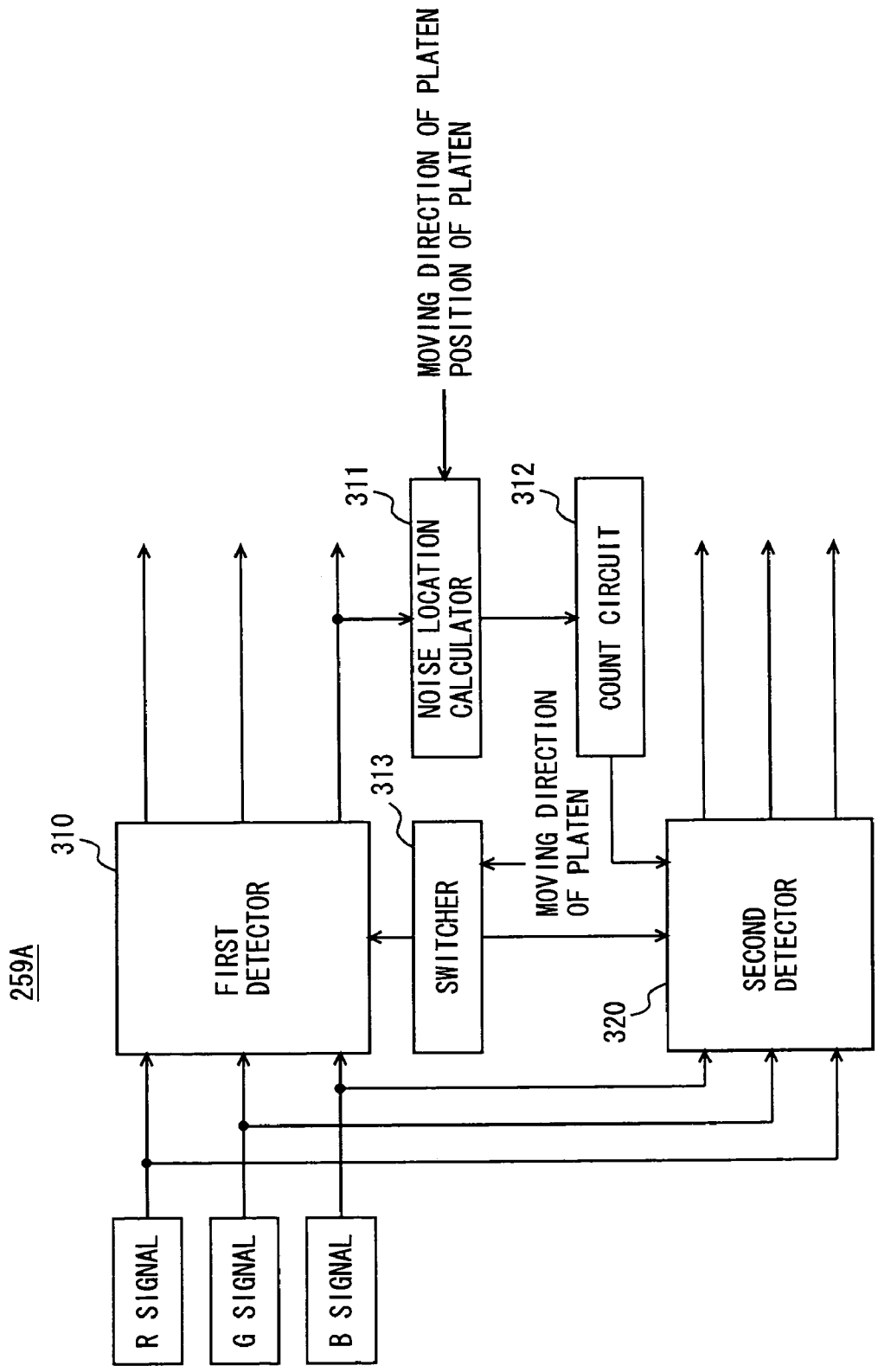
FIG. 12 is a block diagram showing another configuration of a noise detection processor of the image reading apparatus in the present embodiment.

A modified example of the noise detection processor will now be described. FIG. 12 is a block diagram showing another configuration of the noise detection processor of the image reading apparatus in the present embodiment. Referring to FIG. 12, a modified noise detection processor 259A has a construction in which a switcher 313 is added to noise detection processor 259 described above. As other portions of the construction are similar to those of the above-described noise detection processor 259, the descriptions thereof will not be repeated.

Switcher 313 is connected to controller 263 and receives a moving direction of platen 205 from controller 263. When the moving direction of platen 205 is opposite to that in which the original is transported, switcher 313 outputs an activation signal to first detector 310 to activate first detector 310, while it outputs an inactivation signal to second detector 320 and does not activate second detector 320.

In addition, when the moving direction of platen 205 is the direction in which the original is transported, switcher 313 outputs an activation signal to second detector 320 to activate second detector 320, while it outputs an inactivation signal to first detector 310 and does not activate first detector 310.

Since noise detection processor 259A activates either first detector 310 or second detector 320 according to the moving direction of platen 205, execution of needless processing can be avoided and the noise pixel can be detected accurately.

In addition, as second detector 320 detects a noise pixel with a simple method as compared with that for first detector 310, processing load of image reading apparatus 10 can be decreased.

As described above, since platen 205 oscillates in a direction parallel to the direction in which the original is transported in image reading apparatus 10 of the present embodiment, a moving speed of platen 205 may become equal to a transporting speed of the original when platen 205 is moving in a direction opposite that in which the original is transported. Though first detector 310 cannot detect a noise pixel from any of the R, G and B signals in this situation, second detector 320 detects a noise pixel with a method different from that for first detector 310, that is, a method of predicting a location of a noise pixel from the last result of detection with the first detector and determining whether a pixel at the location is a noise pixel or not. As a result, a noise pixel can be detected with improved precision.

Note that while the present embodiment has been described with reader 213 fixed to main body 103 by way of example, alternatively, the present invention is also applicable to moving reader 213 for scanning. For example, the upper restraint plate is of monochromatic color of white or black, and reader 213 or the source of light 206, reflector mirror 209 and reflector member 208 are moved in the sub scanning direction for scanning. During the scan, platen 205 can be oscillated in the sub scanning direction to detect dust adhering on platen 205.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image reading apparatus comprising:
    a plurality of line sensors mutually spaced in a sub scanning direction to scan an original in the sub scanning direction;
    a platen arranged between the original and said plurality of line sensors;

a mover moving said platen at a rate relative to said plurality of line sensors, said rate being different from that of the original relative to said plurality of line sensors;

a first detector configured to detect a noise pixel based on a plurality of data output from said plurality of line sensors; and a second detector configured to detect a subsequent noise pixel based on the noise pixel detected with said first detector, wherein said second detector includes a predictor predicting a location of a subsequent noise pixel based on a location of the noise pixel detected with said first detector, and a determiner determining as to whether a pixel at said location predicted is a noise pixel or not.

2. The image reading apparatus according to claim 1, wherein said determiner includes a comparator comparing a noise pixel detected with said first detector with a feature pixel having a predetermined feature, said feature pixel extracted from data outputted from one of said at least three line sensors at said predicted location, and said determiner determines that the feature pixel is a noise pixel when two numbers approximate to each other.

3. An image reading apparatus comprising:

a plurality of line sensors mutually spaced in a sub scanning direction to scan an original in the sub scanning direction;

a platen arranged between the original and said plurality of line sensors;

a mover moving said platen at a rate relative to said plurality of line sensors, said rate being different from that of the original relative to said plurality of line sensors;

a first detector configured to detect a noise pixel based on a plurality of data output from said plurality of line sensors; and a second detector configured to detect a subsequent noise pixel based on the noise pixel detected with said first detector, wherein said first detector comprises an extractor including a first extractor extracting from a plurality of data output from said plurality of line sensors a first feature pixel having said predetermined feature of a first level and a second extractor extracting from each of said plurality of data a second feature pixel having said predetermined feature of a second level, said first detector detects the first feature pixel as a noise pixel if the second extractor does not extract the second feature pixel from a data other than one of the plurality of data that corresponds to the first feature pixel, said first extractor includes a first edge extractor employing a first filter to extract an edge region and extracts as said first feature pixel a pixel included in an edge region extracted by said first edge extractor, and said second extractor includes a second edge extractor employing a second filter lower in edge detection characteristic than said first filter to extract an edge region, and extracts as said second feature pixel a pixel included in an edge region extracted by said second edge extractor.

\* \* \* \* \*